United States Patent [19]
Dexter

[11] 3,821,162
[45] June 28, 1974

[54] BENZOPHENONE-3,4,3,4-TETRACARBOXYLIC ACID DIIMIDES OF 3,5-DIALKYL-4-HYDROXYPHENYLSUBSTITUTED AMINES

[75] Inventor: Martin Dexter, Briarcliff Manor, N.Y.

[73] Assignee: Ciba-Geigy Corporation, Ardsley, N.Y.

[22] Filed: Jan. 17, 1973

[21] Appl. No.: 324,477

Related U.S. Application Data

[62] Division of Ser. No. 186,560, Oct. 4, 1971, Pat. No. 3,734,926.

[52] U.S. Cl. .................. 260/45.8 N, 260/326 N
[51] Int. Cl. ............................................. C08f 45/58
[58] Field of Search ............................ 260/45.8 N

[56] References Cited
UNITED STATES PATENTS

| | | | |
|---|---|---|---|
| 3,734,926 | 5/1973 | Dexter | 260/326 N |
| 3,746,721 | 7/1973 | Stephen | 260/326 S |

*Primary Examiner*—Melvyn I. Marquis

[57] ABSTRACT

Benzophenonetetracarboxylic acid diimides of 3,5-dialkyl-4-hydroxphenylsubstituted amines of this invention effectively stabilize organic materials against the effects of heat and oxygen. The diimides of this invention are prepared by reacting the appropriate 3,5-dialkyl-4-hydroxyphenylsubstituted amine with benzophenone-3,4,3',4'-tetracarboxylic acid dianhydride or diimide. An example of this class of stabilizers in N,N'-bis(3,5-di-t-butyl-4-hydroxybenzyl)3,4,3',4'-tetracarboxylic acid-diimide.

3 Claims, No Drawings

BENZOPHENONE-3,4,3,4-TETRACARBOXYLIC ACID DIIMIDES OF 3,5-DIALKYL-4-HYDROXYPHENYLSUBSTITUTED AMINES

This application is a divisional application of U.S. application Ser. No. 186,560, filed on Oct. 4, 1971, now U.S. Pat. No. 3,734,926.

DETAILED DESCRIPTION

This invention relates to novel benzophenone tetracarboxylic acid diimide derivatives of 3,5-dialkyl-4-hydroxyphenylsubstituted amines which are useful as stabilizers for organic polymeric materials which are subject to thermal and oxidative deterioration. The compounds of this invention are represented by the formula:

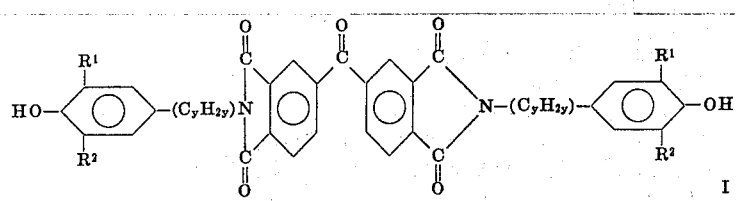

I wherein each of $R^1$ and $R^2$ is the same or different (lower) alkyl group of from one to four carbon atoms; and y has a value of from 0 to 3.

Illustrative examples of (lower) alkyl groups of from one to four carbon atoms which are represented by $R^1$ and $R^2$ are methyl, ethyl, propyl, isopropyl, butyl and t-butyl. The preferred groups are methyl, isopropyl and t-butyl.

The compounds of the formula 1 wherein y is 0, 2 and 3, can be prepared by reacting a 3,5-dialkyl-4-hydroxyphenylsubstituted amine of the formula

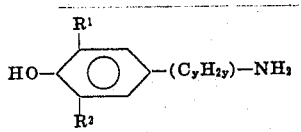

II wherein $R^1$ and $R^2$ are as defined previously, and y is 0, 2 and 3, with benzophenone-3,4,3',4'-tetracarboxylic acid dianhydride in an inert solvent such as dichlorobenzene at reflux temperatures.

The compounds of formula 1 wherein y is 1 can be prepared by reacting 3,5-dialkyl-4-hydroxybenzyl-dialkylamine of the formula

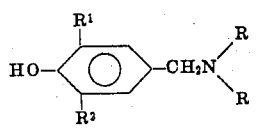

III wherein $R^1$ and $R^2$ are as defined previously and R is an alkyl group such as methyl or ethyl, with benzophenone-3,4,3',4'-tetracarboxylic acid diimide, in an inert solvent such as dimethyl formamide at approximately 120°C.

The 3,5-dialkyl-4-hydroxyphenylsubstituted amines wherein y is 0 can be prepared as described in U.S. Pat. No. 3,198,797. The amine, when y is 2 can be prepared, for example, through chloromethylation of a dialkylphenol as described in U.S. Pat. No. 2,838,571, followed by treatment with sodium or potassium cyanide and reduction of the resultant dialkylhydroxyphenyl acetonitrile to the amine. The amine wherein y is 3 can be prepared by reducing 3,5-dialkyl-4-hydroxyphenyl-propylnitrile with lithium aluminum hydride to yield the corresponding amine. The nitrile can be prepared according to the method described in U.S. Pat. No. 3,121,732 wherein the appropriate dialkylhydroxyphenol is reacted with acrylonitrile. The 3,5-dialkyl-4-hydroxybenzyl dialkyl amine of formula III can be prepared as described by E. P. Previc et al., Industrial and Engineering Chemistry, Vol. 53, No. 6, Page 469, June 1961.

The benzophenone-3,4,3',3'-tetracarboxylic acid diimide can be prepared by methods described in U.S. Pat. No. 3,275,651.

The compounds of this invention are stabilizers of organic polymeric material normally subject to thermal and oxidative deterioration. Materials which are thus stabilized include synthetic organic polymeric substances such as vinyl resins formed from the polymerization of vinyl halides or from the copolymerization of vinyl halides with unsaturated polymerizable compounds, e.g., vinylesters, α,β-unsaturated ketones, α,β-unsaturated aldehydes, and unsaturated hydrocarbons such as butadienes and styrene; poly-α-olefins such as polyethylene, polypropylene, polybutylene, and the like, including copolymers of poly-α-olefins; polyurethanes and polyamides such as poly-hexamethylene adipamide and polycaprolactam; polyesters such as polyethylene terephthalate; polycarbonates; polyacetals; polystyrene; polyethyleneoxide; polyisoprene; polybutadene; and copolymers such as those of high impact polystyrene containing copolymers of butadiene and styrene and those formed by the copolymerization of acrylonitrile, butadiene and/or styrene.

In general, one or more of the stabilizers of the present invention are employed in amounts, in toto, of from about 0.005 to about 5 percent by weight of the composition to be stabilized. A particularly advantageous range of the present stabilizers is from about 0.05 percent to about 2 percent. The preferred range is particularly effective in polyolefins such as polypropylene and polyethylene.

These compounds may be incorporated in the polymer substance during the usual processing operations, for example, by hot-milling, extrusion compounding and the like. The polymers may be produced as films, fibers, filaments, hollow-spheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful co-stabilizers are dilauryl-β-thiodipropionate and distearyl-β-thiodipropionate.

The following formula represents co-stabilizers which are in certain instances very useful in combination with the stabilizers of this invention:

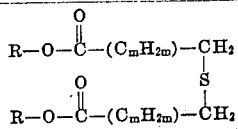

wherein R is an alkyl group having from six to 24 carbon atoms; and $m$ is an integer from 1 to 6. The above co-stabilizers are used in the amount of from 0.01 to 2 percent by weight of the organic material, and preferably from 0.1 to 1 percent.

Other antioxidants, antiozonants, thermal stabilizers, ultraviolet light absorbers, coloring materials, dyes, pigments, metal chelating agents, etc., may also be used in the compositions in combination with the stabilizers of the invention.

The following are presented to further illustrate the present invention without introducing any limitation thereto.

EXAMPLE 1

N,N'-Bis(3,5-di-t-butyl-4-hydroxybenzyl)Benzophenone-3,4,3',4' tetracarboxylic acid diimide To 200 ml. of dimethylformamide were mixed 16.0 g of benzophenone-3,4,3',4'-tetracarboxylic acid diimide (0.05 mole) and 27.6 g of 3,5-di-t-butyl-4-hydroxybenzyl dimethyl amine (0.1 mole). The reaction mixture was heated under a nitrogen atmosphere at 120°C to 125°C for 6 hours. After cooling, the reaction mixture was poured into water. The material obtained was extracted with ether. The ether extract was washed with dilute HCl and then with water. Upon evaporation of the ether, an amorphous solid was obtained. The product was triturated with hot petroleum ether after which it was recrystallized twice from aqueous acetone. The product obtained has a melting point of 218° to 221°C.

Analysis for $C_{47}H_{52}N_2O_7$:
% Calculated: C, 74.58; H, 6.93; N,3.70
% Found: C, 74.34; H,6.89; N,3.54

In a similar manner, by substituting 3-methyl-5-t-butyl-4-hydroxybenzyl-dimethyl amine for 3,5-di-t-butyl-4-hydroxybenzyl-dimethyl amine there is obtained N,N'-bis-(3-methyl-5-t-butyl-4-hydroxybenzyl)-benzophenone 3,4,3',4' tetracarboxylic acid diimide.

EXAMPLE 3

N,N'-Bis(3,5-di-t-butyl-4-hydroxyphenyl) benzophenone-3,4,3',4'-tetracarboxylic acid diimide The reaction flask is charged with 11.05 g (0.05 moles) of 4-amino-2,6-di-t-butylphenol, 8.0 g (0.025 mole) of benzophenone-3,4,3',4'-tetracarboxylic acid dianhydride and 100 ml of 0-dichlorobenzene. The reaction mixture is heated to reflux until the imidization is completed. After cooling, the mixture is filtered and washed with petroleum ether. The filtrate is dried and recrystallized from aqueous acetone acid and filtered, after which it is washed with acetic acid and dried.

By substituting an equivalent amount of β-(3,5-di-t-butyl-4-hydroxyphenylethyl)amine for 3,5-di-t-butyl-4-hydroxyphenylamine in the above procedure, the corresponding N,N'-bis [β-(3,5-di-t-butyl-4-hydroxyphenyl)ethyl] benzophenone-3,4,3',4'-tetracarboxylic diimide is obtained.

In a similar manner, by substituting an equivalent amount of 3-(3,5-di-t-butyl-4-hydroxyphenyl)propylamine for 3,5-di-t-butyl-4-hydroxyphenylamine in the above procedure, the corresponding N,N'-bis[3-3,5-di-t-butyl-4-hydroxyphenyl)propyl] benzophenone-3,4,3',4'-tetracarboxylic acid diimide is obtained.

EXAMPLE 4

Unstabilized polypropylene powder (Hercules Profax 6501) was thoroughly blended with 0.2 percent by weight of N,N'-bis(3,5-di-t-butyl-4-hydroxylbenzyl)benzophenone-3,4,3',4'-tetracarboxylic diimide.

Also prepared were samples of polypropylene containing 0.1 percent by weight of the same stabilizer and 0.3 percent by weight of distearylthiodipropionate (D-STDP). The blended materials were then milled on a two-roll mill at 182° C for 10 minutes, after which time the stabilized polypropylene was sheeted from the mill and allowed to cool.

The milled polypropylene sheets were then cut into pieces and pressed for 7 minutes on a hydraulic press at 218° C, 2,000 pounds per square inch pressure. The resulting sheets of 25 mil thickness were tested for resistance to accelerated aging in a forced draft oven at 150° C. The results are set out in Table I below:

TABLE I

| Additive(s) | Oven Aging At 150° Hours to Failure |
| --- | --- |
| 0.2% of N,N'-bis(3,5,di-t-butyl-4-hydroxybenzyl)benzophenone-3,4,3',4'-tetracarboxylic acid diimide | 50 |
| 0.1% of N,N'-bis(3,5-di-t-butyl-4-hydroxybenzyl)benzophenone-3, 4,3',4'-tetracarboxylic acid diimide + 0.3% DSTDP | 2070 |
| Unstabilized Polypropylene | 3 |
| 0.3% DSTDP* alone | <20 |

*distearylthiodipropionate (a synergist for phenolic antioxidants)

The above data clearly indicates the significant increase in the stabilization of polypropylene upon addition of the antioxidants of the present invention.

Stabilized polypropylene compositions are also obtained when 0.5 percent of N,N'-bis[3-(3,5-di-t-butyl-4-hydroxyphenyl)propyl]benzophenone-3,4,3',4'-tetracarboxylic acid diimide, N,N'-bis(3-methyl-5-t-butyl-4-hydroxybenzyl)benzophenone-3,4,3',4'-tetracarboxylic acid diimide N,N'-bis(3,5-di-t-butyl-4-hydroxyphenyl 3',4'-tetracarboxylic acid diimide respectively are employed alone or in combination with DSTDP.

EXAMPLE 5

Pellets (500 g) of unstabilized nylon-6,6 (Zytel 101, Dupont) are placed in a Kitchen Aid Mixer. With mixing a solution of 2.5 g (0.5 percent) of N,N'-bis(3,5-di-t-butyl-4-hydroxyphenyl)benzophenone-3,4,3',4'-tetracarboxylic acid diimide in 20 ml of acetone is added slowly to the nylon pellets. The stabilized pellets are dried at 80°C at <1mm for 4 hours.

The polyamide formulation is extruded at 600°F through a ¼ inch die into a rod which is water cooled and chopped into pellets. A ¾ inch Brabender extruder, equipped with a nylon screw, is used. The pellets are dried at 80° at <1mm for 4 hours.

The dried pellets are pressed into 5 inches × 5 inches × 0.005 inch films at 290° and 350 psi for 3 minutes. The mold is transferred quickly to a water-cooled press and maintained at 350 psi for 2 to 3 minutes.

Samples (2.2 g) of compression molded nylon-6,6 films are aged in an air circulating rotary oven at 150°C for various time periods. The viscosity of a 11 percent formic acid solution of aged and unaged polymer samples are determined at 25°C. Stabilizer effectiveness is judged by the percent retention of specific viscosity, color-formation, and weight retention after oven aging. The stabilized polyamide has better viscosity, color retention, and substantially less weight loss than a polyamide which is unstabilized after oven aging.

Stabilized polyamide compositions are prepared in a similar manner as above with the following stabilizers:

a. 0.5 percent of N,N'-bis(3,5-di-t-butyl-4-hydroxybenzyl)benzophenone-3,4,3',4'-tetracarboxylic acid diimide b. 0.5 percent of N,N'-bis(3-methyl-4-t-butyl-4-hydroxybenzyl)benzophenone-3,4,3',4'-tetracarboxylic acid diimide c. 0.5 percent of N,N'-bis[2-(3,5-di-t-butyl-4-hydroxypheny)ethyl]benzophenone-3,4,3',4'-tetracarboxylic acid diimide.

EXAMPLE 6

A quantity of SBR emulsion containing 100 g of rubber (500 ml of cold SBR type 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution which has been acidified with HCl to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for one-half hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm.) at 40°–45°C.

The dried rubber (25 g) is heated under nitrogen at 125° in a Brabender mixer and to this is added with mixing 0.125 g (0.5 percent) of N,N'-bis[3-(3,5-di-t-butyl-4-hydroxyphenyl)propyl])benzophenone-3,4,3',4'-tetracarboxylic acid diimide. The composition is mixed for 5 minutes after which it is cooled and compression molded at 125° C into 5 inches × 5 inches × 0.025 inch plaques.

The plaques are placed on aluminum sheets and heated in a circulating air oven at 100° C for up to 96 hours. The viscosity of a 0.5 percent toluene solution of aged and unaged rubber samples are determined at 25°C. Stabilizer effectiveness is judged by the percent retention of specific viscosity, color formation and gel content after oven aging. The stabilized rubber has better viscosity, color retention and less gel content than the rubber which is unstabilized after oven aging.

Similar results are obtained when N,N'-bis-(3,5-di-t-butyl-4-hydroxybenzyl)benzophenone-3,4,3',4'-tetracarboxylic acid diimide is used in place of the above mentioned stabilizer in the rubber composition.

EXAMPLE 7

A composition is prepared comprising linear polyethylene and 0.1% by weight of N,N'-bis(3,5-di-t-butyl-4-hydroxybenzyl)benzophenone-3,4,3',4'-tetracarboxylic acid diimide. This composition resists discoloration at 120° C longer than one which does not contain the stabilizer.

What is claimed is:

1. A composition of matter stabilized against oxidative deterioration which comprises an organic polymeric material normally subject to oxidative deterioration containing from 0.005 to 5 percent by weight of a stabilizing compound of the formula

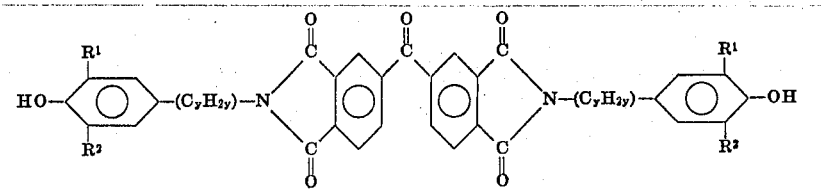

wherein
each of $R^1$ and $R^2$ is the same or different (lower) alkyl group of from one to four carbon atoms; and y has a value of from 0 to 3.

2. The composition of claim 1 wherein $R^1$ and $R^2$ is tertiary butyl or methyl.

3. The composition of claim 2 wherein the stabilizing compound is N,N'-bis-3,5-di-t-butyl-4-hydroxybenzyl)benzophenone-3,4,3',4'-tetracarboxylic acid diimide.

* * * * *